US008074178B2

(12) United States Patent
Hudson

(10) Patent No.: US 8,074,178 B2
(45) Date of Patent: Dec. 6, 2011

(54) VISUAL FEEDBACK DISPLAY

(75) Inventor: Brian Hudson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 11/761,412

(22) Filed: Jun. 12, 2007

(65) Prior Publication Data

US 2008/0313538 A1 Dec. 18, 2008

(51) Int. Cl.
*G06F 3/048* (2006.01)
*G06F 3/00* (2006.01)
*G06F 3/041* (2006.01)

(52) U.S. Cl. ........ 715/764; 715/702; 715/786; 715/808; 715/810; 715/841; 715/974; 345/173

(58) Field of Classification Search .................. 715/702, 715/810, 808, 789, 764, 842, 841, 974, 77, 715/834, 786, 788, 815, 800, 865, 833, 719, 715/722; 345/179, 173
See application file for complete search history.

(56) References Cited

U.S. PATENT DOCUMENTS

| | | | | |
|---|---|---|---|---|
| 5,559,944 A | | 9/1996 | Ono | 395/156 |
| 5,689,667 A | * | 11/1997 | Kurtenbach | 715/810 |
| 5,708,787 A | * | 1/1998 | Nakano et al. | 715/841 |
| 5,790,820 A | * | 8/1998 | Vayda et al. | 715/834 |
| 5,828,360 A | * | 10/1998 | Anderson et al. | 715/834 |
| 6,094,197 A | * | 7/2000 | Buxton et al. | 715/863 |
| 6,337,698 B1 | * | 1/2002 | Keely et al. | 715/823 |
| 6,664,991 B1 | * | 12/2003 | Chew et al. | 715/863 |
| 6,741,266 B1 | * | 5/2004 | Kamiwada et al. | 715/768 |
| 7,034,802 B1 | * | 4/2006 | Gettemy et al. | 345/156 |
| 7,058,902 B2 | * | 6/2006 | Iwema et al. | 715/810 |
| 7,093,201 B2 | * | 8/2006 | Duarte | 715/853 |
| 7,216,302 B2 | * | 5/2007 | Rodden et al. | 715/815 |
| 7,437,678 B2 | * | 10/2008 | Awada et al. | 715/784 |
| 7,533,352 B2 | * | 5/2009 | Chew et al. | 715/781 |
| 2002/0167534 A1 | * | 11/2002 | Burke | 345/629 |
| 2003/0011638 A1 | * | 1/2003 | Chung | 345/808 |

(Continued)

FOREIGN PATENT DOCUMENTS

| | | |
|---|---|---|
| CN | 1717648 A | 1/2006 |
| KR | 10-2002-0082510 | 10/2002 |
| KR | 10-2006-0119527 | 11/2006 |

OTHER PUBLICATIONS

International Search Report dated Oct. 24, 2008 International Application No. PCT/US2008/065629. Chinese First Office Action dated Jul. 29, 2011 cited in Application No. 200880020183.06.

*Primary Examiner* — Tadeese Hailu
*Assistant Examiner* — Nicholas Ulrich
(74) *Attorney, Agent, or Firm* — Merchant & Gould

(57) ABSTRACT

Visual feedback may be provided. First, a continuous contact with a first point on a surface may be detected. The surface may comprise, for example, a touch screen or a touch pad. The continuous contact may be caused by a selecting element comprising, for example, a stylus or a digit of a subject. Then a menu may be displayed in response to the detected continuous contact. The menu may comprise a plurality of menu selectable elements. Next it may be detected that the continuous contact has moved from the first point on the surface to a second point on the surface. The second point may correspond to a one of the plurality of menu selectable elements. Then a control may be displayed corresponding the one of the plurality of menu selectable elements.

20 Claims, 7 Drawing Sheets

U.S. PATENT DOCUMENTS

| | | | |
|---|---|---|---|
| 2003/0146934 A1* | 8/2003 | Bailey et al. | 345/765 |
| 2004/0021647 A1* | 2/2004 | Iwema et al. | 345/179 |
| 2004/0075693 A1* | 4/2004 | Moyer et al. | 345/810 |
| 2004/0165012 A1* | 8/2004 | Nelson et al. | 345/828 |
| 2004/0230916 A1* | 11/2004 | Salvatori et al. | 715/810 |
| 2005/0076309 A1* | 4/2005 | Goldsmith | 715/811 |
| 2005/0246645 A1* | 11/2005 | Beam et al. | 715/747 |
| 2006/0022953 A1* | 2/2006 | Franttila | 345/173 |
| 2006/0161846 A1 | 7/2006 | Van Leeuwen | |
| 2006/0265653 A1* | 11/2006 | Paasonen et al. | 715/704 |
| 2007/0008300 A1 | 1/2007 | Yang et al. | 345/173 |
| 2007/0257891 A1* | 11/2007 | Esenther et al. | 345/173 |

* cited by examiner

VISUAL FEEDBACK DISPLAY

BACKGROUND

Conventional touch-based input solutions commonly utilize a "point and click" approach to interaction. Visual elements on a screen (e.g. icons, hyperlinks, buttons, or edit boxes) present the opportunity for a user to give a system information or input. The user taps on touch-sensitive portions of the screen to simulate what is often achieved by hovering a mouse cursor over the control and clicking.

A problem often encountered when deploying touch-based devices is calibrating the touch-screen so that when the user taps on an "OK" button, the use does not end up actually missing the control, or triggering a nearby control without intending. This is sometimes mitigated by creating oversized controls that are harder to miss because of their larger target area. On mobile devices, however, people usually use a stylus instead, continuing to rely on small buttons with precision of the touch input via the stylus.

Often, a set of cascading menus or tab controls is used to put similar options or controls into groupings. This results in the user having to tap on small areas of the screen multiple times in order to access the control data, or option that they are looking to view or change. On a small portable device, this can be tedious and cause the user to lose patience with the device.

SUMMARY

This Summary is provided to introduce a selection of concepts in a simplified form that are further described below in the Detailed Description. This Summary is not intended to identify key features or essential features of the claimed subject matter. Nor is this Summary intended to foe used to limit the claimed subject matter's scope.

Visual feedback may be provided. First a continuous contact with a first point on a surface may be detected. The surface may comprise, for example, a touch screen or a touch pad. The continuous contact may be caused by a selecting element comprising, for example, a stylus or a digit of a subject. Then a menu may be displayed in response to the detected continuous contact. The menu may comprise a plurality of menu selectable elements. Next, it may foe detected that the continuous contact has moved from the first point on the surface to a second point on the surface. The second point may correspond to a one of the plurality of menu selectable elements. Then a control may be displayed corresponding the one of the plurality of menu selectable elements.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described m the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
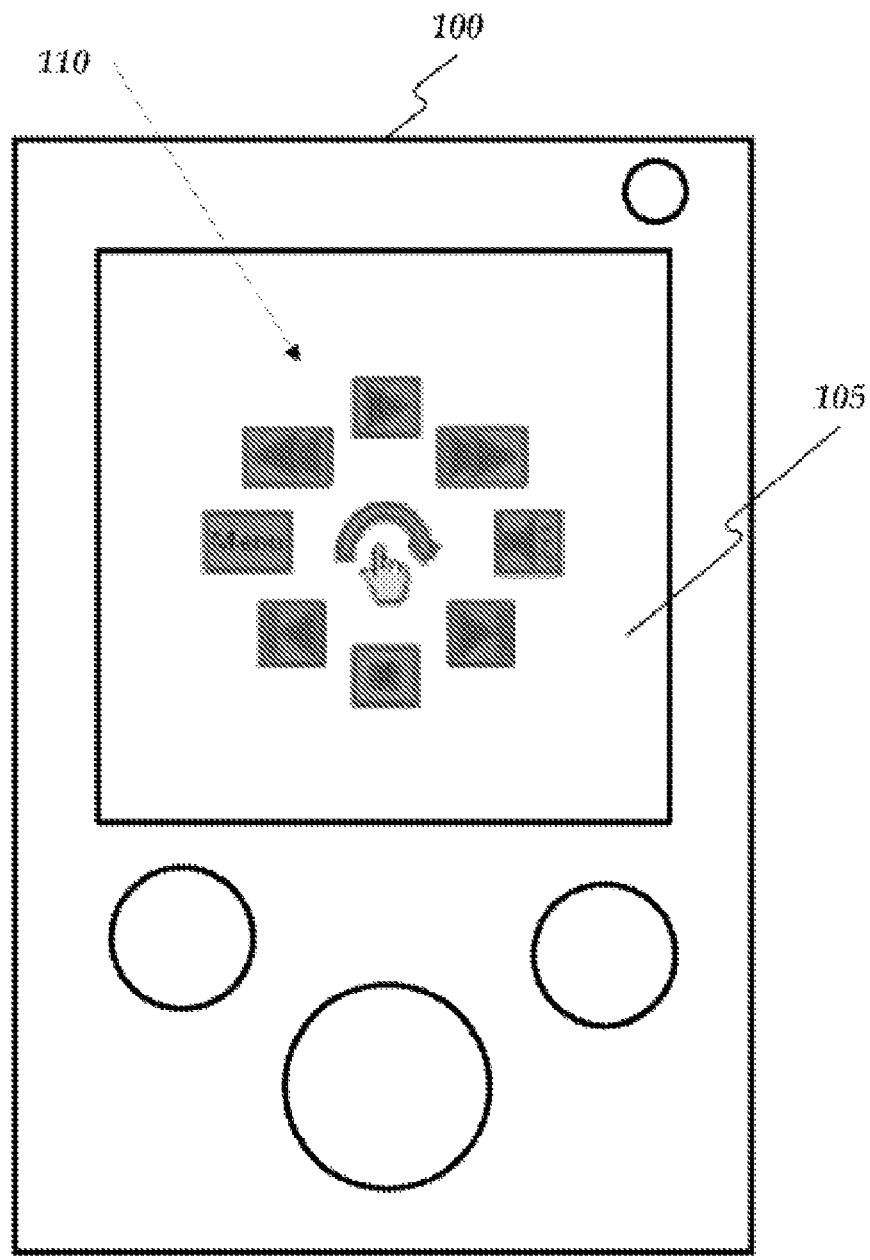
FIG. 1 is a block diagram of an operating environment.

The following detailed description refers to the accompanying drawings. Wherever possible, the same reference numbers are used in the drawings and the following description to refer to the same or similar elements. While embodiments of the invention may be described modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Many conventional touch screen user interfaces are cumbersome and hard to use without a stylus. Consistent with embodiments of the present invention, an input model may be provided that makes it easier to use a digit (e.g. finger or thumb) to interact with a touch screen device by using screen space more intelligently and in a way that makes interaction intuitive. Embodiments of the invention may provide this by using the relative position of interaction with a screen rather than absolute positioning (e.g. the "hunt-and-peck" approach).

FIG. 1 shows a computing: device 100 comprising a screen 105 having a menu 110 displayed on screen 105. Computing device 100 may comprise a personal computer, a network computer, a mainframe, or other similar microcomputer-based workstation. Computing device 100 may though comprise any type of computer operating environment, such as hand-held devices, multiprocessor systems, microprocessor-based or programmable sender electronic devices, minicomputers; mainframe computers, and the like. Furthermore, computing device 100 may comprise a mobile terminal, such as a smart phone, a cellular telephone, a cellular telephone utilizing wireless application protocol (WAP), a personal digital assistant (PDA), intelligent pager, a portable computer, a hand held computer, a conventional telephone, or a facsimile machine. The aforementioned systems and devices are exemplary and computing device 100 may comprise other systems or devices.

Embodiments of the present invention may enable the user to tap (and optionally) maintain contact with screen 105. The absolute position of this initial touch point may be used as a starling point for reference to display visual feedback. Moreover, this initial touch point may option as well as a reference point for future relative motion of the touch-point from the digit (or stylus). Consistent with embodiments of the invention, the user may not need to tap a particular point on screen 105 to hit a desired control. Instead, a control may be drawn relative to the initial touch. With subsequent commands, inputs may be computed based on relative position of subsequent touch points. This may reduce errors due to calibration of the display and touch sensor.

Screen 105 may be efficiently used by redrawing controls as a user moves the digit (or stylus) to different areas of screen 105. For example, rather than tapping multiple times on predefined points to drill into a deep hierarchical menu structure, the menu items may be drawn surrounding the touchpoint.

When the touchpoint moves toward an option, the sub-options may then be drawn surrounding the new touchpoint. This recursion may continue with each new set of options being drawn over or in place of the previous set until the user picks a final item/option. Consequently, the user may only have to tap and hold once to complete an entire interaction (e.g. manipulating a control's value, or drilling through menus, and ultimately selecting an action).

Accordingly, embodiments of the invention may provide intelligent layout of menus/controls/actions based on: i) a current point, of contact on a touch screen; or ii) the initial contact point of an interaction and the amount of space available on the screen in each of the cardinal directions from the touch point. The menu/control may be drawn as large as possible given the available space.

Moreover, embodiments of the invention may provide touch input location based layout and drawing of user interface elements. For example, the location where a control is drawn may be predicated on where the users finger or stylus is currently touching: the screen or where the touch action started. The control may be drawn in a "ready to use" state. For example, a volume slider/scroller may be drawn with the "thumb" aligned with the current touchpoint along the axis of manipulation. Moreover, embodiments may take into account user preferences such as left or right-handedness.

Figure 2:
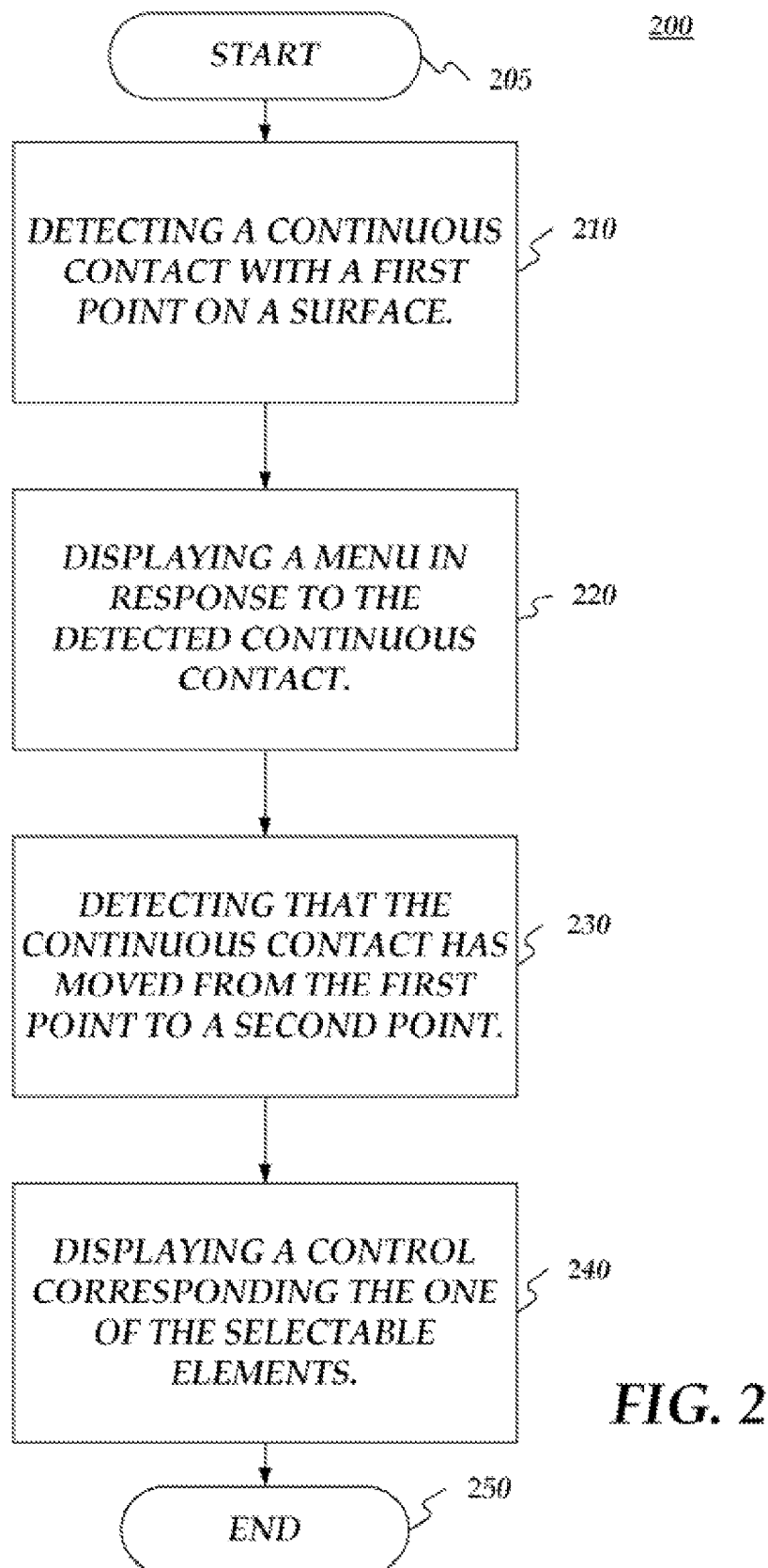
FIG. 2 is a flow chart of a method for providing a visual feedback display.
Figure 3:
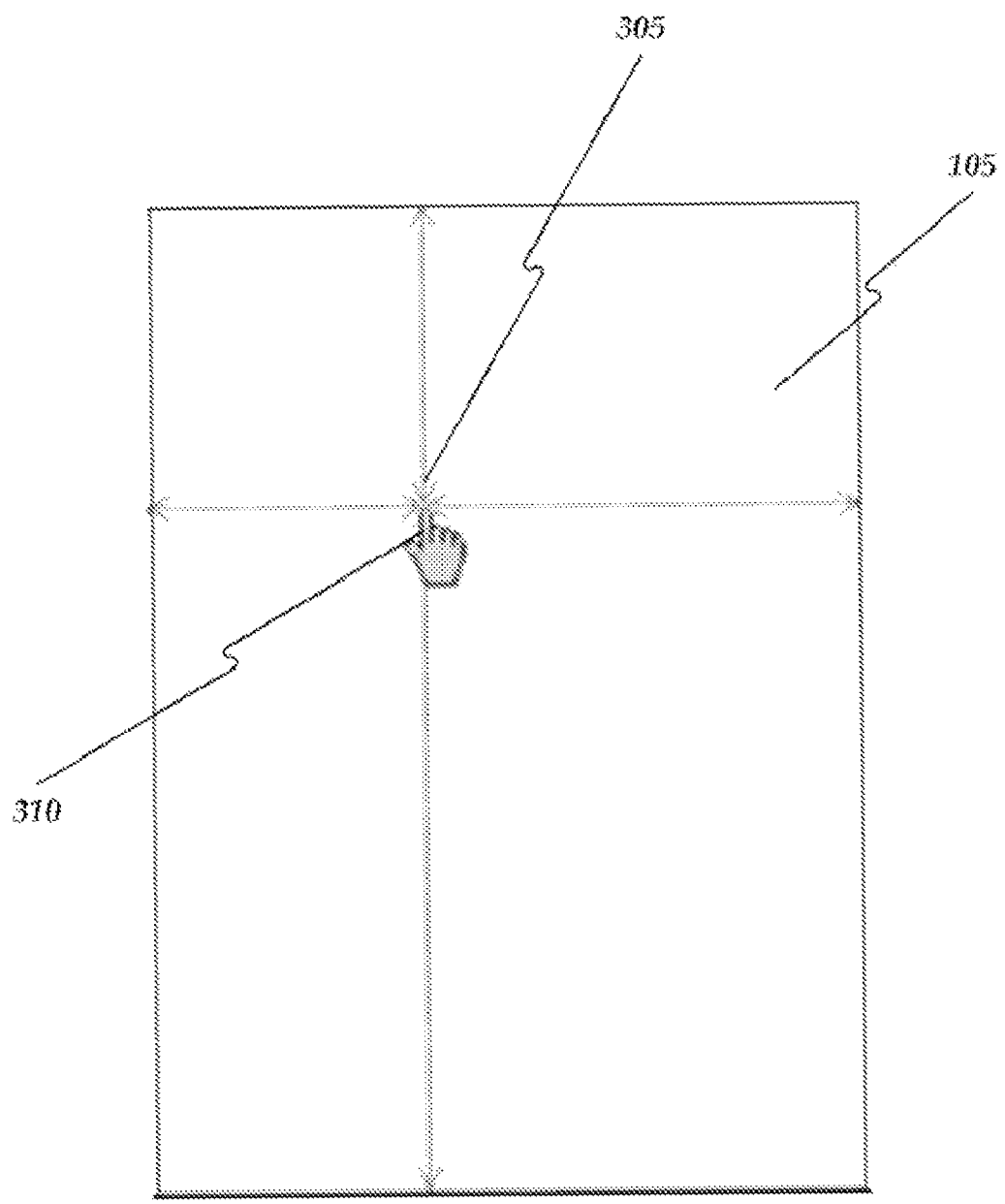
FIG. 3 is a diagram illustrating a display.

FIG. 2 is a flow chart setting forth the general stages involved in a method 200 consistent with an embodiment of the invention for providing visual feedback. Method 200 may be implemented using computing device 100 as described in more detail below with respect to FIG. 7. Ways to implement the stages of method 200 will be described in greater detail below. Method 200 may begin at starting block 205 and may proceed to stage 210 where computing device 100 may detect a continuous contact with a first point on a surface. FIG. 3 shows screen 105, a first point 305 on screen 105, and a digit 310 (e.g. finger) of a subject (e.g. a user). When the user taps screen 105 and holds down digit 310 at first point 305 (e.g. "hovering"), computing device may store coordinates of first point 305 and may compute an amount of space available on screen 105 surrounding (e.g. in proximity to) first point 305.

The surface described: above may comprise a touch screen (e.g. screen 105) or a touch pad. The aforementioned are examples, and the surface may comprise other devices. Furthermore, the detected continuous contact described above may be caused by a selecting element comprising, for example, a stylus or digit 310 of a subject. The aforementioned are examples, and the selecting element may comprise other devices. The subject may comprise a person operating computing device 100.

Figure 4:
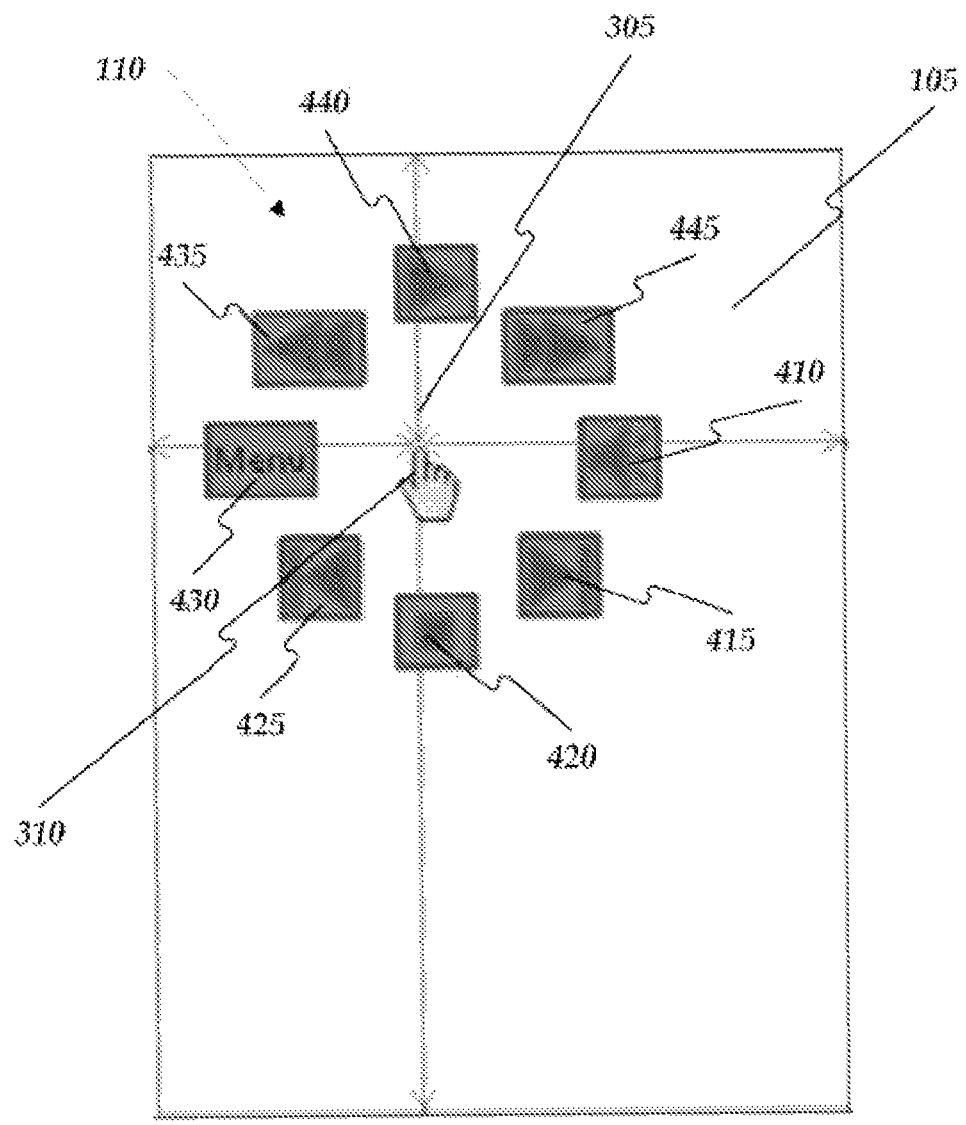
FIG. 4 is a diagram illustrating a display.

From stage 210, where computing device 100 detects the continuous contact with first point 305 on the surface, method 200 may advance to stage 220 where computing device 100 may display menu 110 in response to the detected continuous contact on the surface relative to first point 305. For example, as shown in FIG. 4, based on the aforementioned amount of space available, computing device 100 may layout menu 110. Menu 110 may comprise a plurality of selectable menu elements 410 through 445. Computing device 100, for example, may evenly space on menu 110, plurality of selectable menu elements 410 through 445 to display icons, images, or text strings and may render those items onto screen 105. For example, if first point 305 were located in a corner of screen 105, plurality of selectable menu elements 410 through 445 may be spaced out in the ninety degrees of space available.

Similarly, if first point 305 were located on an edge of screen 105, plurality of selectable menu elements 410 through 445 may be spaced out in the one hundred and eighty degrees of space available.

Figure 5:
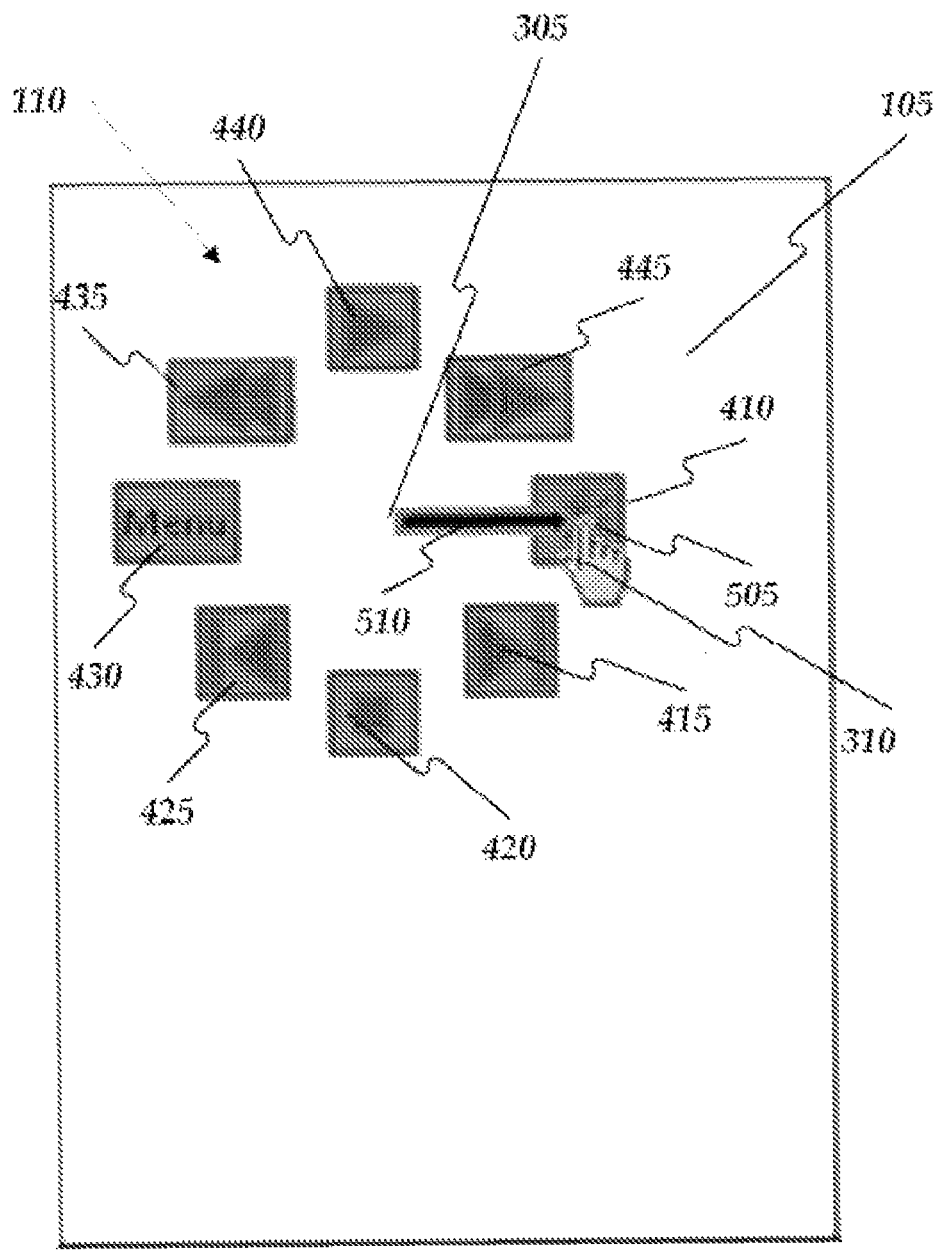
FIG. 5 is a diagram illustrating a display.

Once computing device 100 displays menu 110 in stage 220, method 200 may continue to stage 230 where computing device 100 may detect that the continuous contact has moved from first point 305 on the surface to a second point 505 on the surface as shown in FIG. 5. Second point 505 may correspond to a one of the selectable elements 410. For example, as shown in FIG. 5, the user may drag hovering digit 310 (e.g. or a stylus) from first point 305 toward a selectable menu element 410 at second point 505. Computing device 100 may continually monitor the movements of hovering digit 310 and may apply an algorithm to determine which of selectable menu elements 410 through 445 the user intended to select. For example, the algorithm may consider first point 305, second point 505, and a path 510 taken from first point 305 to second point 505. Path 510 may be measured, for example, at a constant frequency by a touch driver in computing device 100. Moreover, the algorithm may consider the velocity of digit 310 (based, for example, on successive distances between samples taken from the touch driver). The aforementioned information may be useful for determining if digit 310 has hovered over any of plurality of selectable menu elements 410 through 445 long enough to consider it "selected."

Figure 6:
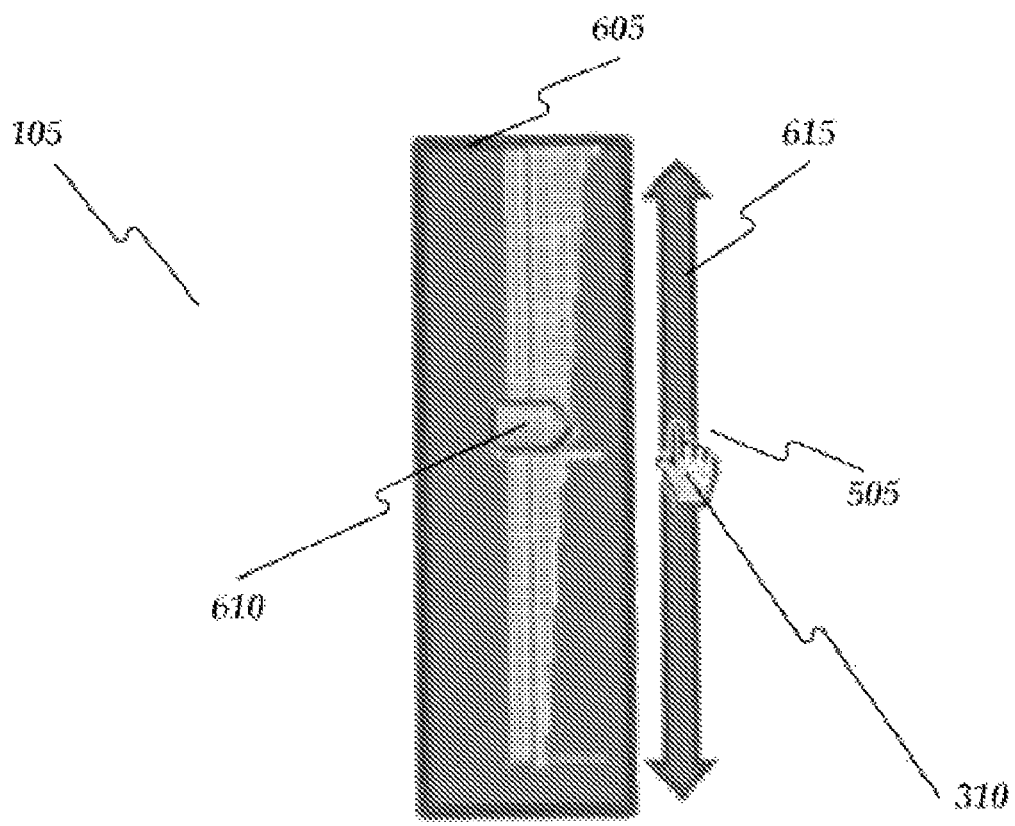
FIG. 6 is a diagram illustrating a display.

After computing device 100 detects that the continuous contact has moved in stage 230, method 200 may proceed to stage 240 where computing device 100 may display a control 605 corresponding selectable menu element 410 relative, for example, to second point 505. For example, as shown in FIG. 6, after determining which item the user was intending to select (e.g. selectable menu element 410), computing device 100 may store the current location of digit 310 again, recalculate the available space on screen 105, and decide where to draw a set of items associated with selected control 605. As shown in the FIG. 6 example, the user has selected a volume icon. While control 605 corresponding to selectable menu element 410 may be drawn, embodiments of the invention may draw yet another menu in response to selectable menu element 410.

For example, using the data gathered, computing device 100 may draw control 605 to allow the user to adjust the volume on computing device 100 by moving digit 310 up and down in path 615. The context shown in FIG. 6 may be represented in several ways. For example, the initial position of control 605 (e.g. the "thumb" in the volume slider) may be aligned with the current touch position (e.g. the second point) on a horizontal axis. Furthermore, the control may be scaled to use as much space as possible on screen 105. In addition, an arrow may be drawn beneath second point 505, extending up and down to indicate to the user that motion on this axis of screen 105 may affect the control. This concept may be extended to different option dialogs, hierarchical menu structures, new controls, and may be applicable in a number of fields from portable devices, to industrial automation, to medical display, and control systems, for example.

Embodiments of the invention may also display control 605 based on whether the user is left-handed or right handed. For example, the user may enter into computing device 100 which hand the user favors. In response to this information, computing device may display control 605 in such a way that the user's hand for stylus) does not block control 605. For example, when if is determined that the user corresponding to selectable menu element 410 is left-handed, a portion of an area in which control 605 is displayed may be to the right of second point 505. Similarly, when it is determined that the user corresponding to selectable menu element 410 is right-handed, a portion of the area in which control 605 is displayed may be to the left of second: point 505. In this way, the user may see control 605 without being obstructed by the users own hand. As shown in FIG. 6, control 605 may be placed to the left of second point 505 because computing device may have data indicating that the user corresponding to digit 310 is right-handed. Furthermore, control 605 may be placed vertical, horizontal, or in any other orientation based upon where second point 505 is located on screen 105. For example, if second point 505 were on an edge or corner of screen 105, control 605 may be placed horizontally or vertically. Once computing device 100 displays the control in stage 240, method 200 may then end at stage 250.

An embodiment consistent with the invention may comprise a system for providing visual feedback. The system may comprise a memory storage and a processing unit coupled to the memory storage. The processing unit may be operative to detect a continuous contact with a first point on a surface and to display a menu in response to the detected continuous contact. The menu may compose a plurality of menu selectable elements. The processing unit may be further operative to defect that the continuous contact has moved from the first point on the surface to a second point on the surface. The second point may correspond to a one of the plurality of menu selectable elements. The processing unit may be further operative to display a control corresponding to the one of the plurality of menu selectable elements.

Another embodiment consistent with the invention may comprise a system for providing visual feedback. The system may comprise a memory storage and a processing unit coupled to the memory storage. The processing unit may be operative to display a menu in response to a selecting element hovering over a touch screen at a first point. The menu may comprise a plurality of menu selectable elements displayed relative to the fret point. The processing unit may be further operative to determine that the selecting element has moved across the screen from the first point to a second point. The second point may correspond to a one of the plurality of menu selectable elements. The processing unit may be further operative to display a control corresponding the one of the plurality of menu selectable elements. The control may be displayed relative to the second point wherein a control selectable element corresponding to the control is displayed at the second point.

Yet another embodiment consistent with the invention may comprise a system for providing visual feedback. The system may comprise a memory storage and a processing unit coupled to the memory storage. The processing unit may be operative to detect a digit: of a user hovering at a first point on a surface and to display, relative to the first point, a first menu in response to the detected hovering digit. The first menu may comprise a plurality of first menu selectable elements. The processing unit may be further operative to determine that the detected hovering digit has moved from the first point on the surface to a second point on the surface. The second point may correspond to a one of the plurality of first menu selectable elements. Moreover, the processing unit may be operative to remove, in response to determining that the detected hovering digit has moved, the first menu from the screen and to display, relative to the second point, a second menu corresponding the one of the plurality of first menu selectable elements.

Figure 7:
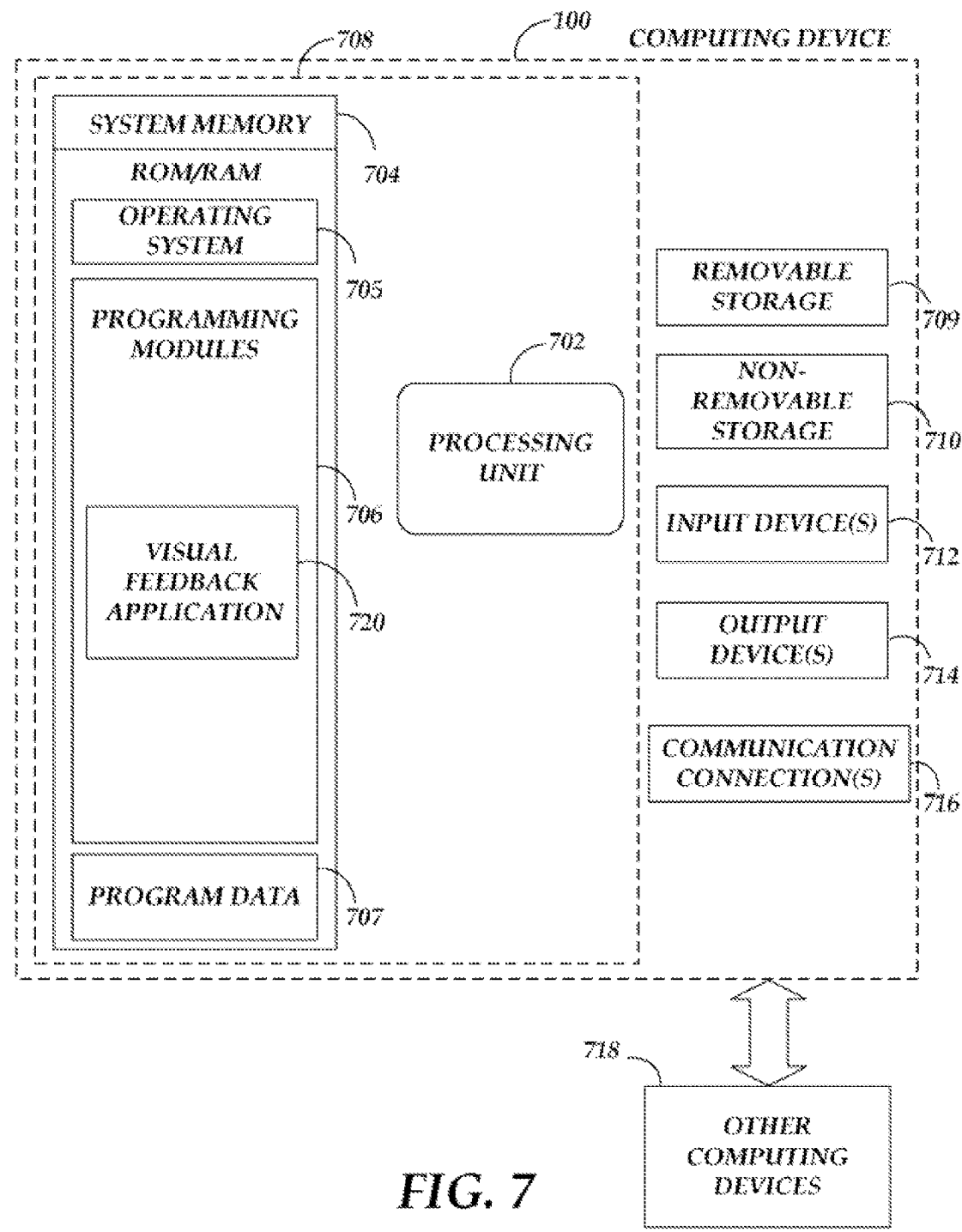
FIG. 7 is a block diagram of a system including a computing device.

FIG. 7 is a block diagram of a system including computing device 100. Consistent with an embodiment of the invention, the aforementioned memory storage and processing unit may be implemented in a computing device, such as computing device 100 of FIG. 7. Any suitable combination of hardware, software, or firmware may be used to implement the memory storage and processing unit. For example, the memory storage and processing unit may be implemented with computing device 100 or any of other computing devices 718, in combination with computing device 100. The aforementioned system, device, and processors are examples and other systems, devices, and processors may comprise the aforementioned memory storage and processing unit, consistent with embodiments of the invention.

With reference to FIG. 7, a system consistent with an embodiment of the invention may include a computing device, such as computing device 100. In a basic configuration, computing device 100 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a program data 707. Operating system 705, for example, may be suitable for controlling computing device 100's operation. In one embodiment, programming modules 706 may include visual feedback application 720. Furthermore, embodiments of the invention may be practiced in conjunction with a graphics library, other operating systems, or any other application program and is not limited to any particular application or system. This basic configuration is illustrated in FIG. 7 by those components within a dashed line 708.

Computing device 100 may have additional features or functionality. For example, computing device 100 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 100. Any such computer storage media may be part of device 100. Computing device 100 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

Computing device 100 may also contain a communication connection 716 that may allow device 100 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g. visual feedback application 720) may perform processes including, for example, one or more method 200's stages as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example hot not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:
1. A method for providing visual feedback, the method comprising:
    detecting a contact with a first point on a surface;
    displaying a menu in response to the detected contact, the menu comprising a plurality of menu selectable elements;

detecting that the contact has moved from the first point on the surface to a second point on the surface, the second point corresponding to a one of the plurality of menu selectable elements; and displaying a control corresponding to the one of the plurality of menu selectable elements, wherein displaying the control corresponding to the one of the plurality of menu selectable elements comprises displaying a slider relative to the second point, wherein a thumb of the slider is displayed at the second point.

2. The method of claim 1, wherein detecting the contact with the first point on the surface comprises detecting the contact with the first point on the surface comprising one of the following: a touch screen and a touch pad.

3. The method of claim 1, wherein detecting the contact comprises detecting the contact being caused by a selecting element comprising one of the following: a stylus and a digit of a subject.

4. The method of claim 1, wherein displaying the menu comprises displaying the menu on the surface.

5. The method of claim 1, wherein displaying the menu comprises displaying the menu on the surface relative to the first point.

6. The method of claim 1, wherein displaying the menu comprises:
 determining a first amount of space on the surface in proximity to the first point; and
 displaying the plurality of menu selectable elements in the determined first amount of space.

7. The method of claim 1, wherein displaying the control comprises displaying the control in a first area on the surface when it is determined that a user is right-handed.

8. The method of claim 1, wherein displaying the control comprises displaying the control in a second area on the surface when it is determined that a user is left-handed.

9. The method of claim 1, wherein displaying the control comprises displaying a volume control associated with the slider.

10. The method of claim 1, wherein displaying the slider comprises displaying, in proximity to the control, indications corresponding to at least one direction in which the control is movable.

11. The method of claim 1, wherein displaying the control further comprises:
 determining a second amount of space on the surface in proximity to the second point; and
 displaying the control in the determined second amount of space.

12. A computer-readable medium which stores a set of instructions which when executed performs a method for providing visual feedback, the method executed by the set of instructions comprising:
 receiving a selecting element hovering over a touch screen at a first point;
 displaying a menu in response to the selecting element hovering over the touch screen at the first point, the menu comprising a plurality of menu selectable elements displayed relative to the first point;
 determining that the selecting element has moved across the screen from the first point to a second point, the second point corresponding to a one of the plurality of menu selectable elements;
 displaying a control corresponding to the one of the plurality of menu selectable elements, the control being displayed relative to the second point wherein a control selectable element corresponding to the control is displayed at the second point, the control comprising a volume adjustment slider; and
 displaying indicators in proximity to the control, the indicators being indicative of at least one direction in which the control selectable element is movable.

13. The computer-readable medium of claim 12, wherein displaying the menu in response to the selecting element comprises displaying the menu in response to the selecting element comprising one of the following: a stylus and a digit of a subject.

14. The computer-readable medium of claim 12, wherein displaying the menu further comprises:
 determining a first amount of space on the touch screen in proximity to the first point; and
 displaying the plurality of menu selectable elements in the determined first amount of space.

15. The computer-readable medium of claim 12, wherein displaying the control comprises displaying the control in a first area on the touch screen when it is determined that a user corresponding to the selecting element is right-handed.

16. The computer-readable medium of claim 12, wherein displaying the control comprises displaying the control in a first area on the screen when it is determined that a user corresponding to the selecting element is right-handed wherein at least a portion of the first area is to the left of the second point.

17. The computer-readable medium of claim 12, wherein displaying the control comprises displaying the control in a second area on the screen when it is determined that a user corresponding to the selecting element is left-handed.

18. The computer-readable medium of claim 12, wherein displaying the control comprises displaying the control in a second area on the screen when it is determined that a user corresponding to the selecting element is left-handed wherein at least a portion of the second area is to the right of the second point.

19. The computer-readable medium of claim 12, wherein displaying the control further comprises:
 determining a second amount of space on the screen in proximity to the second point; and
 displaying the control in the determined second amount of space.

20. A system for providing visual feedback, the system comprising:
 a memory storage; and
 a processing unit coupled to the memory storage, wherein the processing unit is operative to:
  detect a digit of a user hovering at a first point on a surface;
  display, relative to the first point, a first menu in response to the detected hovering digit, the first menu comprising a plurality of first menu selectable elements;
  determine that the detected hovering digit has moved from the first point on the surface to a second point on the surface, the second point corresponding to a one of the plurality of first menu selectable elements;
  remove, in response to determining that the detected hovering digit has moved, the first menu from the screen; and
  display, relative to the second point
   a control corresponding to the plurality of first menu selectable elements, the control comprising a slider relative to the second point, wherein a thumb of the slider is displayed at the second point.

* * * * *